United States Patent
Xiang et al.

(10) Patent No.: US 11,620,973 B2
(45) Date of Patent: Apr. 4, 2023

(54) HIGH TOLERANCE ULTRASONIC TRANSDUCER

(71) Applicant: X-wave Innovations, Inc., Gaithersburg, MD (US)

(72) Inventors: Dan Xiang, Gaithersburg, MD (US); Uday Singh, Gaithersburg, MD (US)

( * ) Notice: Subject to any disclaimer, the term of this patent is extended or adjusted under 35 U.S.C. 154(b) by 800 days.

(21) Appl. No.: 16/528,581

(22) Filed: Jul. 31, 2019

(65) Prior Publication Data
US 2020/0143781 A1 May 7, 2020

Related U.S. Application Data

(60) Provisional application No. 62/766,771, filed on Nov. 5, 2018.

(51) Int. Cl.
| | |
|---|---|
| G10K 11/00 | (2006.01) |
| G01H 11/08 | (2006.01) |
| B06B 1/06 | (2006.01) |
| G10K 11/36 | (2006.01) |

(52) U.S. Cl.
CPC .......... *G10K 11/004* (2013.01); *G01H 11/08* (2013.01); *G10K 11/36* (2013.01)

(58) Field of Classification Search
CPC ...... G10K 11/004; G10K 11/36; G01H 11/08; B06B 1/0644
USPC ........................................................ 310/334
See application file for complete search history.

(56) References Cited

U.S. PATENT DOCUMENTS

| | | |
|---|---|---|
| 3,781,576 A | 12/1973 | Runde |
| 4,505,160 A | 3/1985 | Zacharias, Jr. |
| 4,567,770 A | 2/1986 | Rumbold |
| 4,703,656 A | 11/1987 | Bhardwaj |
| 4,783,997 A | 11/1988 | Lynnworth |
| 5,195,373 A | 3/1993 | Light |

(Continued)

FOREIGN PATENT DOCUMENTS

WO 2012/145479 A1 10/2012

OTHER PUBLICATIONS

Prathamesh N. Bilgunde and Leonard J. Bond, "High Temperature Ultrasonic Immersion Measurements Using a BS-PT Based Piezoelectric Transducer Without a Delay Line", AIP Conference Proceedings 1949, 100003 (2018).

(Continued)

*Primary Examiner* — Daniel L Murphy
(74) *Attorney, Agent, or Firm* — Sheets Law PLLC; Kendal M. Sheets (57) ABSTRACT

An ultrasonic transducer is disclosed. The ultrasonic transducer includes a stainless steel backing comprising a piezoelectric element mounted on a front face of the backing, wherein the stainless steel backing enables operation in high temperature and radiation applications. The ultrasonic transducer further includes a first enclosure comprising a threaded through hole and a second enclosure comprising an opening, wherein the first and second enclosure encapsulates the stainless steel backing, wherein the first enclosure and the second enclosure are joined together using a plurality of enclosure screws, wherein the first enclosure is configured to receive a set screw through the threaded through hole, and wherein the set screw upon being received is configured to make contact with a ceramic ball, and wherein tightening of the set screw pushes the piezoelectric element out of the opening in the second enclosure to make a contact with a work structure.

11 Claims, 10 Drawing Sheets

(56) References Cited

U.S. PATENT DOCUMENTS

5,332,943 A    7/1994    Bhardwaj
5,936,163 A    8/1999    Greathouse
9,425,384 B2   8/2016    Lhuillier
9,618,481 B2   4/2017    Kruger

OTHER PUBLICATIONS

R. Kažys, A. Voleišis, R. Šliteris, B. Voleišiene, L. Mažeika, H. A. Abderrahim, "Research and development of radiation resistant ultrasonic sensors for quasi-image forming systems in a liquid lead-bismuth", ULTRAGARSAS (Ultrasound), vol. 62, No. 3, 2007.
R. Kažys, A. Voleišis, B. Voleišiené, "High temperature ultrasonic transducers: review", ULTRAGARSAS (Ultrasound), vol. 63, No. 2, 2008.
Neelesh Bhadwal, Mina Torabi Milani, Thomas Coyle and Anthony Sinclair, "Dry Coupling of Ultrasonic Transducer Components for High Temperature Applications", Sensors 2019, 19, 5383.
R. Kazys, R. Sliteris, A. Voleisis, B. Voleisiene, A. Abderrahim and P. Kupschus, "Development of ultrasonic transducers for ranging and imaging in heavy liquid metal," Sensors, 2004 IEEE, Vienna, 2004, pp. 646-649 vol 2.

HIGH TOLERANCE ULTRASONIC TRANSDUCER

CROSS-REFERENCE TO RELATED APPLICATIONS

This application claims priority benefits under 35 U.S.C. § 119(e) to U.S. Provisional Application No. 62/766,771 filed Nov. 5, 2018, which is hereby incorporated by reference in its entirety.

FIELD OF INVENTION

The present invention is in the technical field of acoustic and ultrasonic transducers, which act as emitter, receiver or transceiver of acoustic or ultrasonic waves that propagate in solids and fluids. This invention has high tolerance to and can survive the harsh environments such as high temperatures, cryogenic temperatures and high radiation. More specifically, the present invention supports and protects a piezoelectric element to effectively transmit and receive acoustic and ultrasonic waves of certain desirable characteristics into solid or fluid materials when the device is placed under harsh environments.

BACKGROUND

Ultrasound is widely used for non-destructive testing and characterization of materials and components. It has been used to detect defects in components, characterize material properties, determine wall thickness, and sense proximity to mention a few uses.

Many industrial manufacturing processes involve the use of high temperature and pressure to facilitate chemical and physical reactions in the formation of materials, components and structures. Some may also involve radiation and corrosive environments. Some may even involve thermal cycling. These conditions are often encountered in the manufacturing of metal, ceramics, and plastics. They are also encountered in the processing of petroleum and the generation of energy in nuclear, fossil fuel, and hydroelectric power plants. It is highly desirable to be able to monitor the process parameters and structures used in such a practice with the ultrasonic technology. To do so, it is necessary to have an ultrasound transducer that can function properly in those harsh conditions.

One special application related to the present invention is for uses under high temperature and radiation environments, such as the fast neutron reactors and spent nuclear fuel storage casks, for long term condition monitoring. The goal is to have such transducers operating properly in high temperatures and extreme radiation for a lifetime of several tens of years. These transducers must be able to operate as emitters and receivers of acoustic or ultrasonic waves over a wide range of frequencies, typically from megahertz to tens of megahertz.

Because of their generic features, these transducers can be modified for other fields of applications such as the instrumentation of pressurized-water reactors, non-nuclear high-temperature, and cryogenic instrumentations in industries.

High temperature resistant ultrasound transducers are known in the art. An example is the applicant's U.S. Pat. No. 4,703,656 entitled, "Temperature Independent Ultrasound Transducer Device". Other patents in the pertinent art comprise Zacharias, Jr et al. U.S. Pat. No. 4,505,160 entitled, "High-Temperature Transducer", Runde et al. U.S. Pat. No. 3,781,576 entitled, "High Temperature Ultrasonic Transducer"; Lynnworth U.S. Pat. No. 4,783,997 entitled "Ultrasonic Transducer for high Temperature Applications" and Light et al. U.S. Pat. No. 5,195,373 entitled "Ultrasonic Transducer for Extreme Temperature Environment".

A persistent problem with certain high temperature ultrasound transducer devices is maintaining intimate contact between the piezoelectric element and the protecting or the delay block to which it is secured. The adhesive/couplant available for making contact deteriorates at high temperature and most adhesive/couplant being organic epoxy will fail in a radiation environment. A solution to some of these issues has been addressed by Lhuillier et al. U.S. Pat. No. 9,425,384, entitled, "Method for Manufacturing High-Temperature Ultrasonic Transducer using a lithium Niobate Crystal Brazed with gold and Indium".

SUMMARY

The present embodiment is a hard faced contact ultrasonic transducer device suitable for transmitting ultrasound pulses into a work structure at temperature substantially above/below room temperature and other harsh conditions such as extreme radiation present in nuclear fuel storage casks and nuclear reactors. The device comprises a stainless steel backing with a back surface designed to disperse the reflection of acoustic waves. The piezoelectric transducer is bonded on the front face of the backing. The ultrasonic transducer is mechanically mounted on the work structure using nuts and bolts. The free face of the piezoelectric material contacts the work structure into which an acoustic pulse may be launched. A pressure screw connected to the body of the transducer forces the backing against the work structure to maintain high pressure required for operation of the piezoelectric element at all conditions of operation. Thus, the piezoelectric element is mechanically held between the work structure and metallic backing, under high pressure and maintaining electrical connections at all conditions of operation.

One design of this invention provides an ultrasonic transducer suitable for high temperature and radiation operation. The transducer design consists of stainless steel and ceramic being radiation resistant, which makes transducer radiation safe. The present invention includes a stainless housing having a cylindrical opening in it. The piezoelectric transducer attached to the metal backing is pushed out of the cylindrical opening and makes both electrical and mechanical contact with the wall. The transducer operation requires high pressure which is provided by its design and will maintain the pressure at high temperature. The transducer device which is a contact type transducer design is configurable to provide a narrow ultrasound pulse having a center frequency from 1 MHz to 33 MHz simply by changing the piezoelectric element.

It is a further objective of this invention to eliminate the failure of the bond between the piezoelectric element and the delay block by using the mechanical structure to hold all components in place while permitting the piezoelectric transducer to generate pulses of desired frequency, frequency distribution and pulse width without undesired echoes and/or attenuations. It is also a further objective of this invention that the pulse width and attenuation characteristics of the transducer devices are not reduced at elevated temperature in order to remain in stable operations over a long period of time.

BRIEF DESCRIPTION OF THE DRAWINGS

The present embodiment is better understood by reference to the following detailed description when considered in connection with the accompanying drawings, wherein.

DETAILED DESCRIPTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

Referring now to FIGS. 1-5, an embodiment of the invention is illustrated. The invention as previously mentioned, may be employed in systems to monitor internal conditions inside a nuclear waste cask or nuclear reactor, in such an application the materials choice in the realization of present invention is crucial. For the high temperature and radiation applications, the invention has a stainless steel (304) backing indicated by numeral 10. The piezoelectric element is mounted on the front face 11 of the backing. The piezoelectric element can be LiNbCF, quartz, AlN, ZnO or any other piezoelectric material suitable for its application environment. The preferred geometry of the piezoelectric element is a circular shape disc but square and rectangular disc are also acceptable in current invention. The piezoelectric element top and bottom surfaces are coated with Cr/Au thin film. The Cr/Au thin film acts as high temperature mechanical couplant for efficient transfer of sonic energy from piezoelectric element to the work structure. The piezoelectric element is mounted on the backing with silver paint. The backing is encapsulated by two enclosures made of stainless steel (316). The top enclosure marked by numeral 13 and bottom enclosure is marked by numeral 19. The backing is electrically isolated from the enclosure 13 and 19 with the use of ceramic washer 21, a ceramic ball 14 and a set of four ceramic rods 18a-18d. The electrical connection to the backing is established by stainless steel (304) threaded rod 15 and internally threaded stainless steel (304) tube 16. The rod 15 and tube 16 are electrically connected to the backing but are electrically isolated from the enclosure. The two enclosures 13 and 19 are joined together using four stainless (316) enclosure screws 27a-27d (visible in FIG. 3) with components, backing 10, four ceramic rods 18a-18d, ceramic washer 21, ceramic ball 14, carbon steel spring washer 23 and rf connection 15, 16, properly assembled.

Still referring to FIGS. 1-5, the top enclosure has threaded through hole 24, through which a set screw 22 is inserted to make a contact with the ceramic ball 14. When screw 22 is tightened, the backing material 10 with a piezoelectric element mounted on surface 11 is pushed out through the opening 12 in the bottom enclosure, thus the piezoelectric element makes contact with the work structure (not visible here). On further establishing the electrical contact the screw 22 is used to apply force on the piezoelectric element. The carbon steel spring 23 retracts the backing inside the enclosure 13, 19, when the transducer is either not mounted on the work structure or during transportation, to prevent damages to the piezoelectric element.

Now referring to FIGS. 6-9, the detail view of the backing 10 used in embodiment shown in FIGS. 1-5 is illustrated. The backing material made of metal, preferably stainless steel 304, is circular in shape. The bottom surface 11 is a flat surface for mounting the piezoelectric element. The top surface has a hemisphere 31 in the center and two hemispherical slots 32 and 33 around the hemisphere 31. The radii of the hemisphere 31, and hemispherical slots 32 and 33, are variants of the invention and based on the operation frequency of the transducer. The slot radius for 32 is three times the radius of hemisphere 31 and slot radius for 33 is five times the radius of hemisphere 31. According to one variant of the invention each radius of the three hemispheres have offsets of 3 λ/4 for slot 32 and 5 λ/4 for slot 33, where λ is the wavelength of an acoustic wave in the backing. The ceramic ball 14 (referring to FIG. 1) is a same radius as of the hemisphere 31.

Still referring to FIGS. 6-9, the backing has four thread holes 34a-34d, for rf connection rod 15 and tube 16 (referring to FIGS. 1-5). According to the variant of the invention the maximum depth for holes 34a-34d is limited to three times the radius of hemisphere 31. The surface 35 is inclined with respect to vertical. According to the variant of the invention, the inclination is variable from 0 degree to 45 degrees. The backing 10 has four alignment slots 35a-35d and their curvature radius is same as the ceramic rods 18a-18d (referring to FIG. 5). The purpose of the slots 35a-35d is to keep the backing aligned when it is moved in and out of the enclosure and also to prevent rotation of the backing when the pressure screw (referring to FIG. 5) is turned to increase the pressure on the piezoelectric element.

Now referring to FIGS. 10-13, the detail view of the top enclosure 13 used in the embodiment shown in FIGS. 1-5 is illustrated. The purpose of this unit is to provide the enclosure as well as the mechanical support to apply a high pressure to the piezoelectric element via pressure screw 22 (referring FIGS. 1-5). The top enclosure 13 is a disc shape structure with a tapped through hole 24 for the pressure screw 22. The through hole 41a-41d are for mounting screws 20a-20d. The through hole 41a-41d also have a screw head clearance (visible in FIG. 12) to minimize the overall thickness of the transducer.

Still referring to FIGS. 10-13, the bottom surface 44 of the top enclosure 13 has blind tapped holes 42a-42d to join top enclosure 13 and bottom enclosure 19 with a set of four enclosure screws 27a-27d. During joining, the bottom surface 44 is in direct contact with the bottom enclosure. The top enclosure 13 also has a clearance for the backing 10 and a ceramic ball 14 to retract inside the enclosure.

Now referring to FIGS. 14-17, the detail view of the bottom enclosure 19 used in the embodiment shown in FIGS. 1-5 is illustrated. The bottom enclosure 19 includes a shape like a circular disc with a clearance 51 for all essential components for the transducer. In the clearance 51, a ceramic washer 21, disc spring 23, backing 10, ceramic ball 14 are housed in a respective order. It has four guiding slots 54a-54d with slot radius the same as the slots 35a-35d in backing 10. The ceramic rods 18a-18d fit between slots 54a-54d and slots 35a-35d to prevent rotation of backing and help guiding when the backing is drawn out of the opening 12 in the bottom of the bottom enclosure. The slot 52 provides a clearance for the rods 15 and tubes 16.

Still referring to FIGS. 14-17, in the transducer assembly the surface 53 is in intimate contact with surface 44 of the top enclosure 13. The two units are fastened using four bolts 27a-27d (see FIG. 5). The four through holes 57a-57d is for four bolts 27a-27d and four through holes 58a-58d are clearance holes for four bolts 20a-20d. For proper coaxial alignment of the bottom enclosure 19, the transducer assembly has alignment ring 54. The outer radius of the alignment ring is same as the internal radius for the clearance hole 43 in the top enclosure 13. On installation of the transducer, the surface 25 of the bottom enclosure is in both mechanical and electrical contact with the work structure. The cylindrical surface 55 is the alignment surface allowing the transducer to be aligned in the mounting ring 17.

Figure 1:
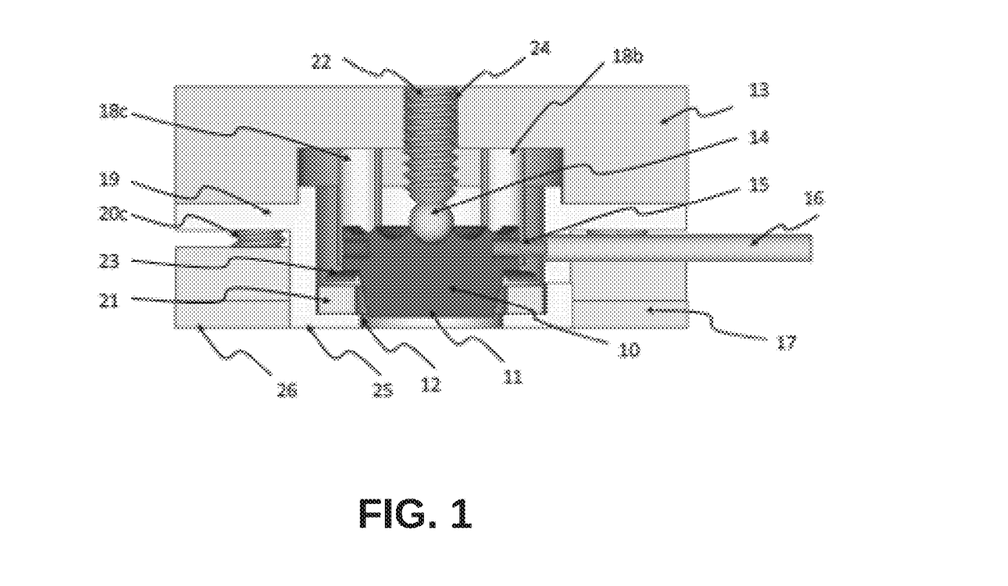
FIG. 1 is an external isometric view in reduced scale of the embodiment.
Figure 2:
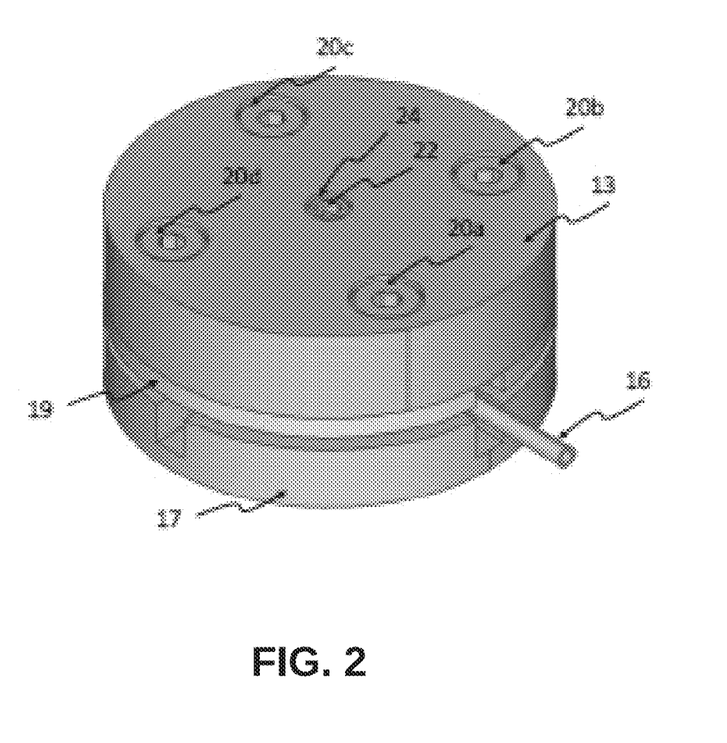
FIG. 2 is an external isometric view of the embodiment in reduced scale.
Figure 3:
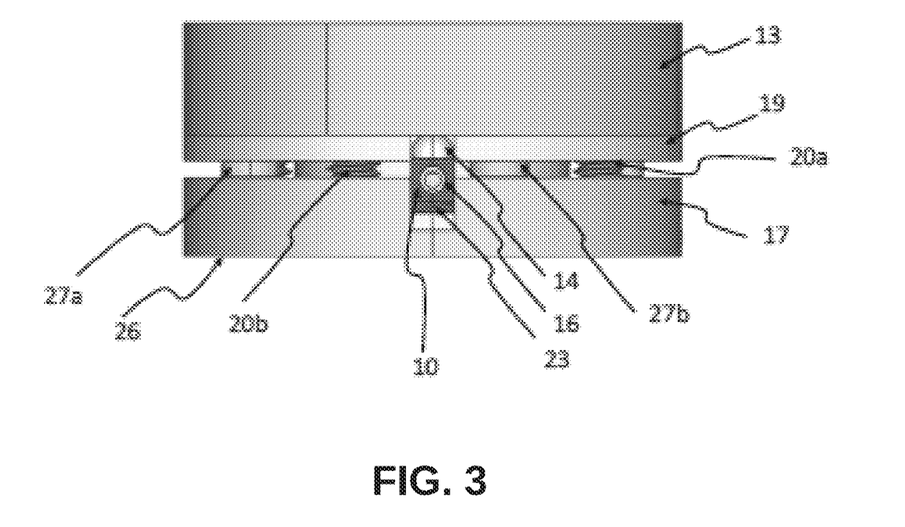
FIG. 3 is a side view with an rf electrode i-s facing toward the reader.
Figure 4:
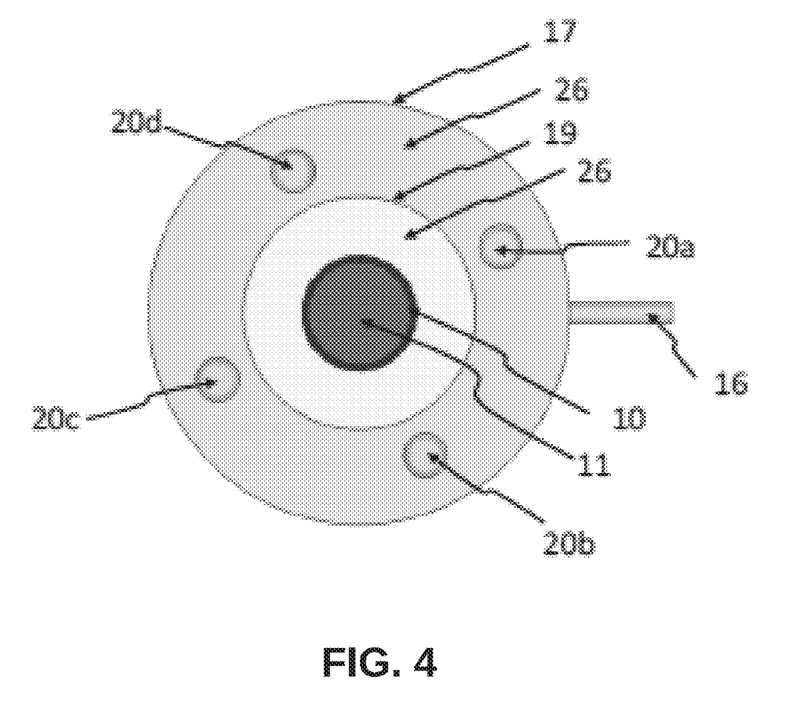
FIG. 4 is a bottom view of the embodiment.
Figure 5:
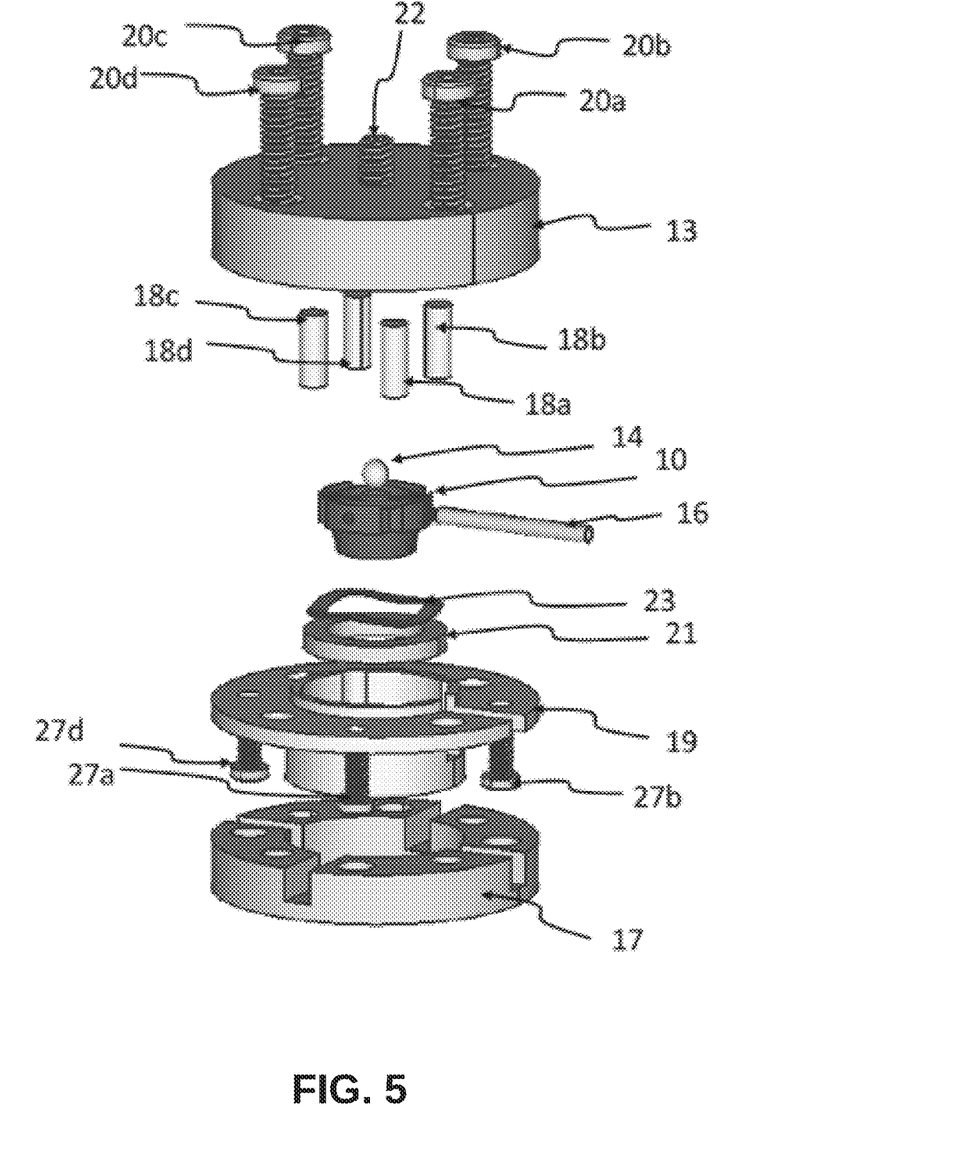
FIG. 5 is an exploded view of the embodiment.
Figure 6:
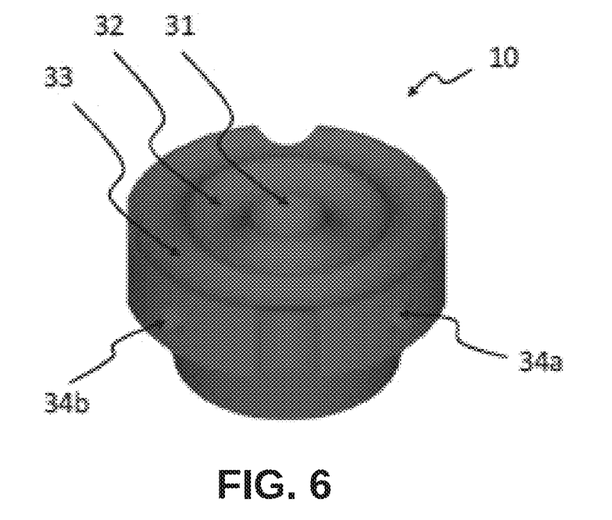
FIG. 6 is an isometric view of the backing for the embodiment shown in FIG. 1 and FIG. 5.
Figure 7:
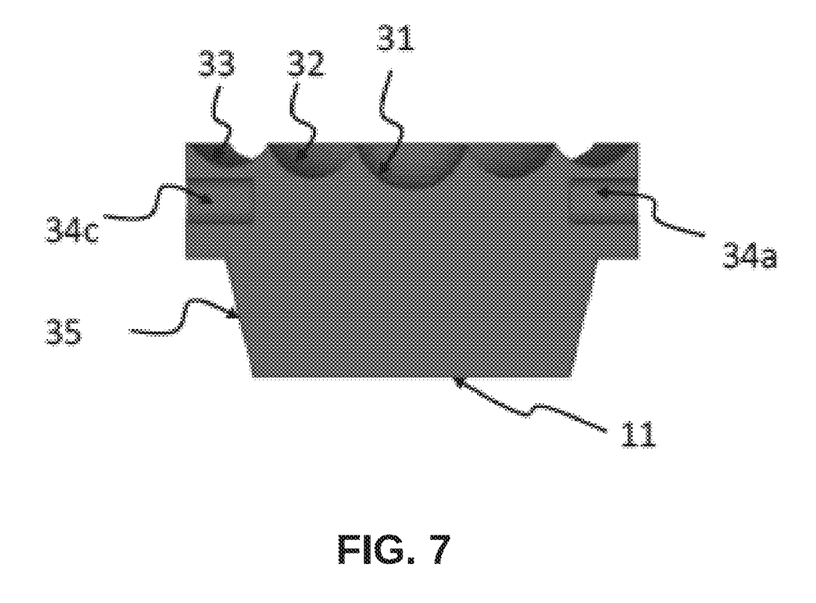
FIG. 7 is a section view of the backing for the embodiment shown in FIG. 1 and FIG. 5.
Figure 8:
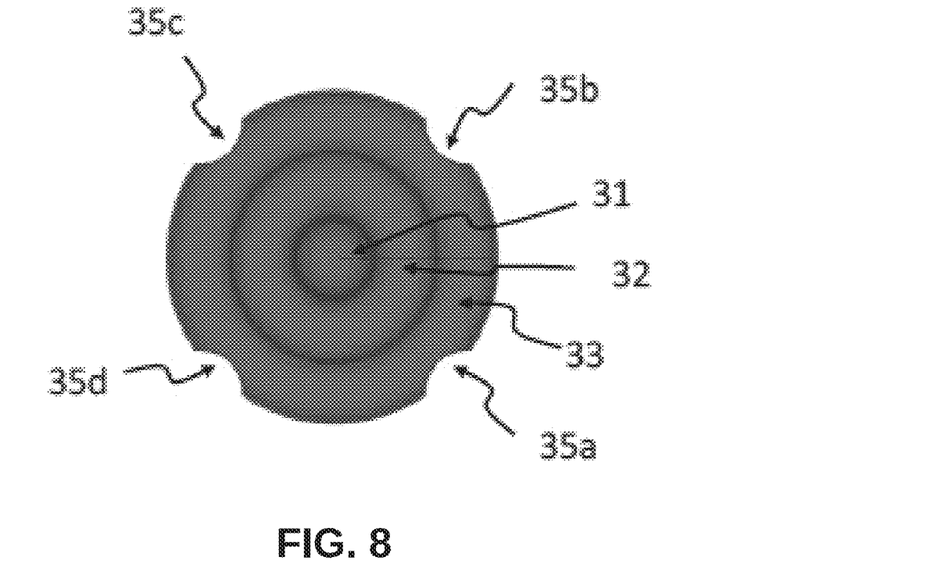
FIG. 8 is a top view of the backing for the embodiment shown in FIG. 1 and FIG. 5.
Figure 9:
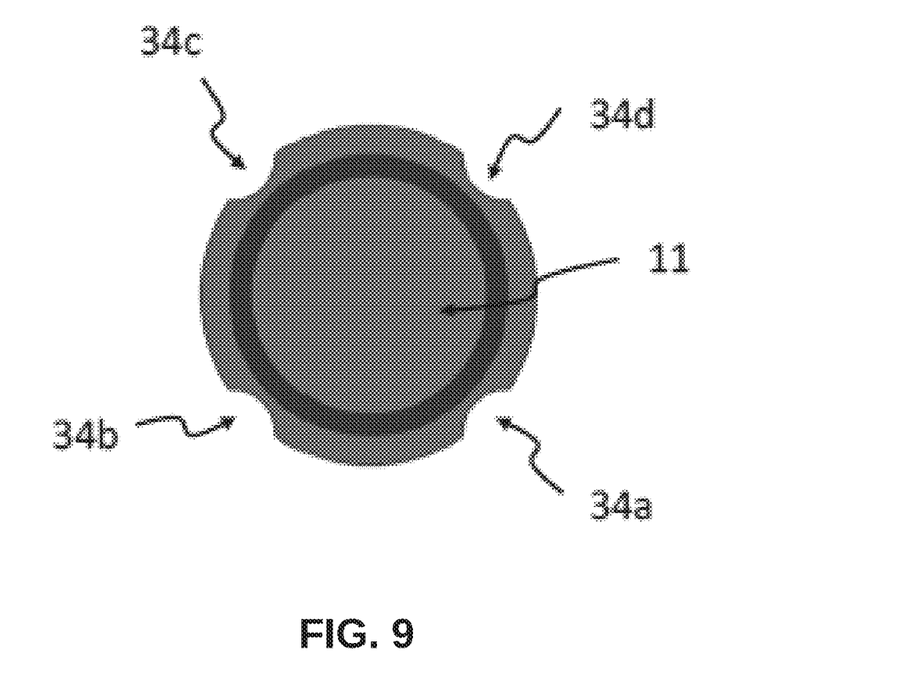
FIG. 9 is a bottom view of the backing for the embodiment shown in FIG. 1 and FIG. 5.
Figure 10:
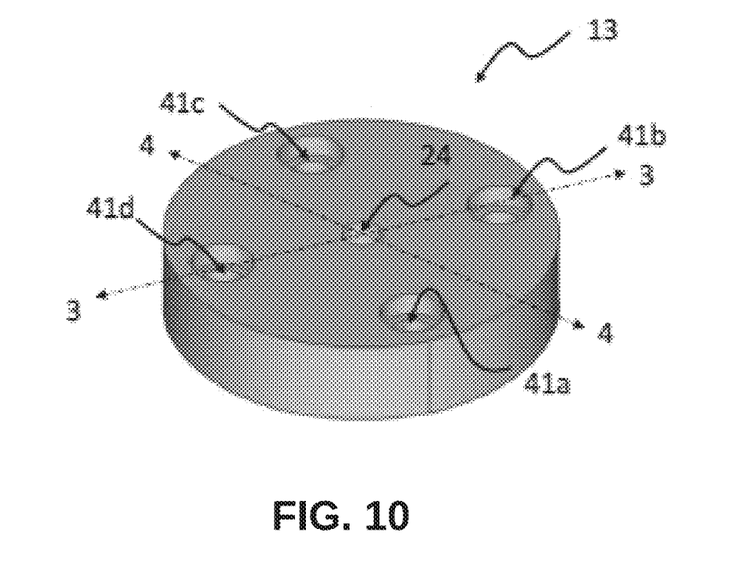
FIG. 10 is an isometric view of the top enclosure for the embodiment shown in FIGS. 1-3, and FIG. 5.
Figure 11:
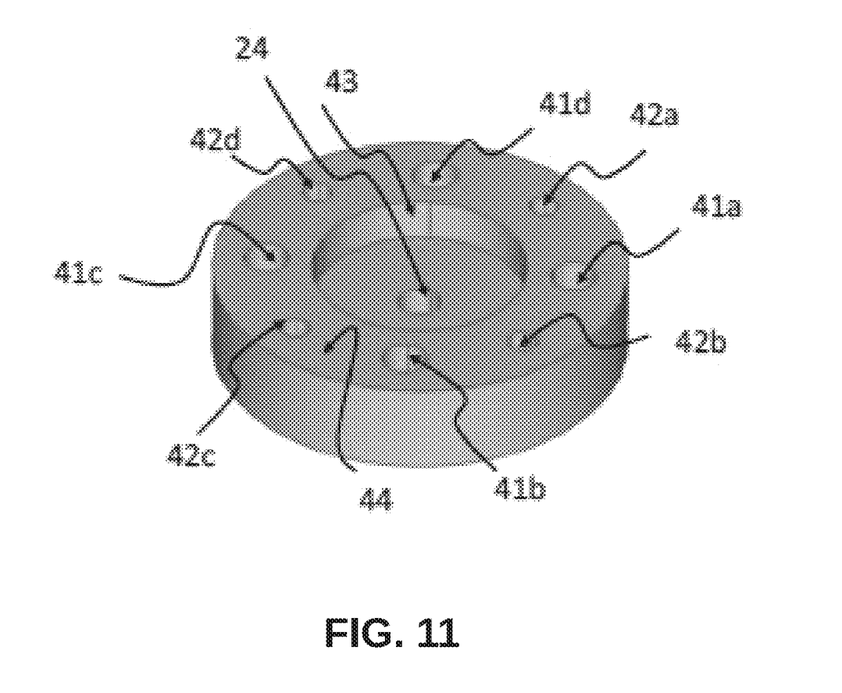
FIG. 11 is a bottom isomeric view of the top enclosure for the embodiment shown in FIGS. 1-3 and FIG. 5.
Figure 12:
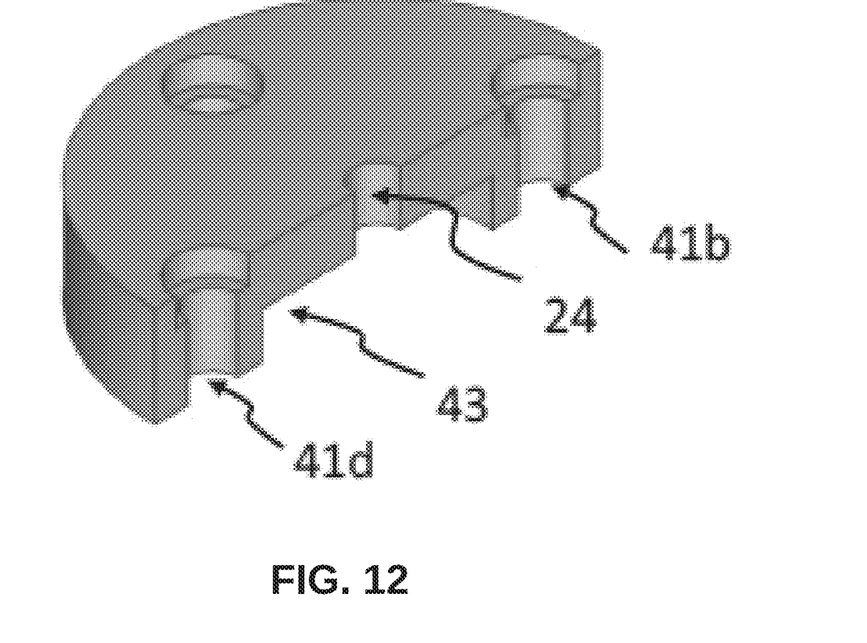
FIG. 12 a cross-sectional view of the top enclosure taken along line 3-3 of FIG. 10.
Figure 13:
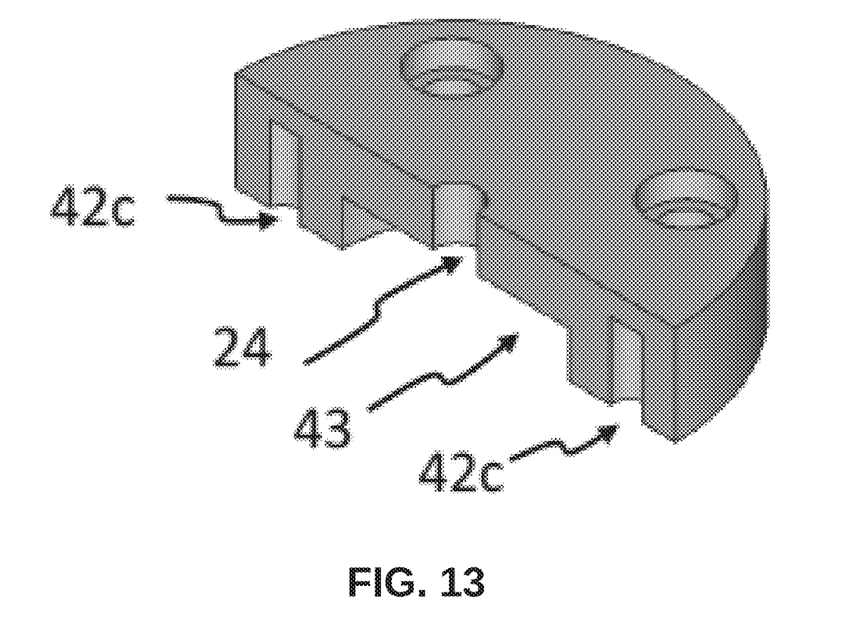
FIG. 13 a cross-sectional view of the top enclosure taken along line 4-4 of FIG. 10.
Figure 14:
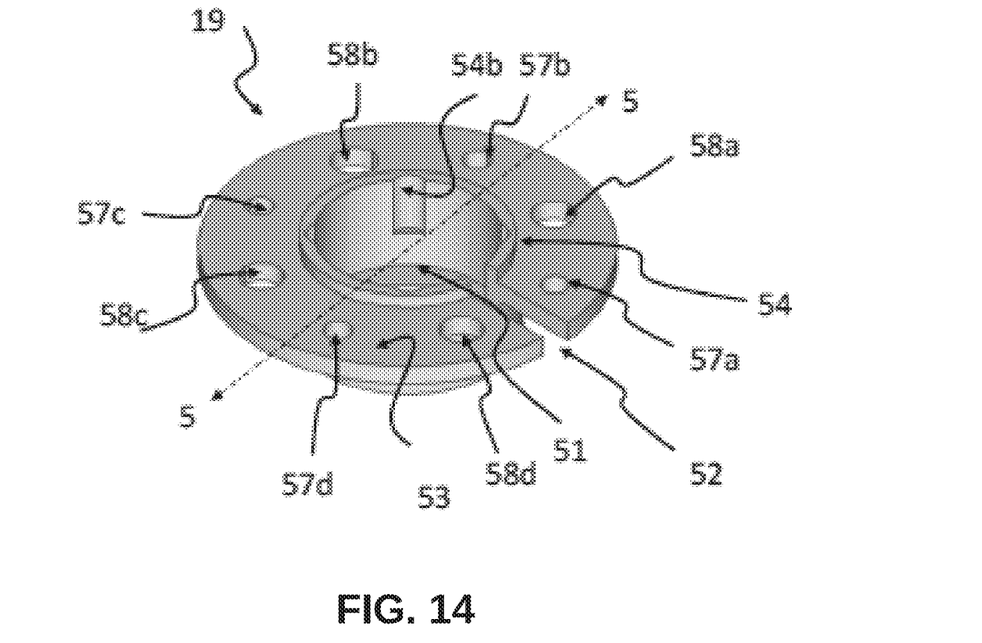
FIG. 14 is an isometric view of the bottom enclosure for the embodiment shown in FIGS. 1-5.
Figure 15:
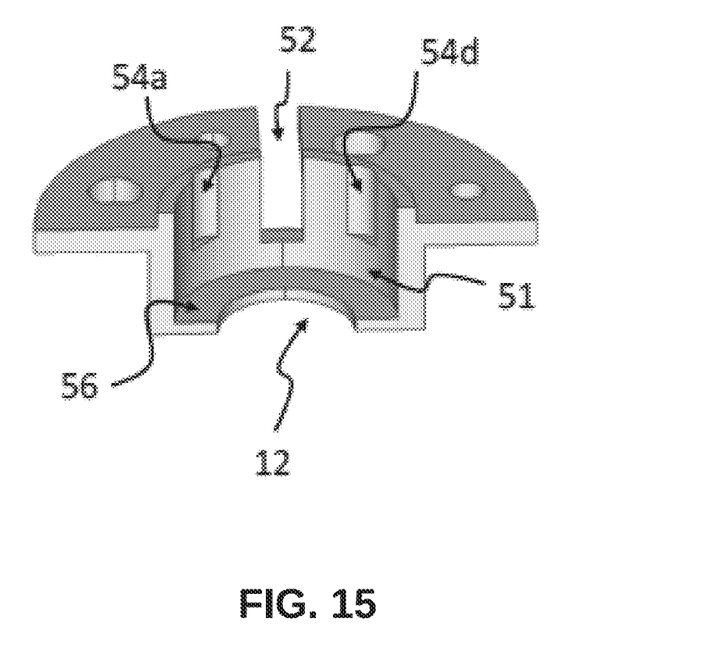
FIG. 15 a cross-sectional view of the bottom enclosure taken along line 5-5 of FIG. 10.
Figure 16:
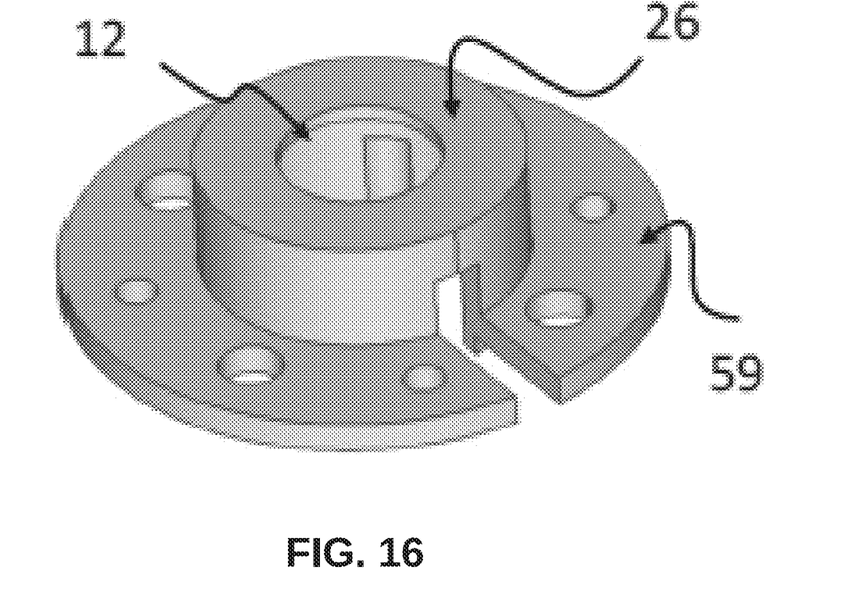
FIG. 16 is a bottom isomeric view of the bottom enclosure for the embodiment shown in FIGS. 1-5.
Figure 17:
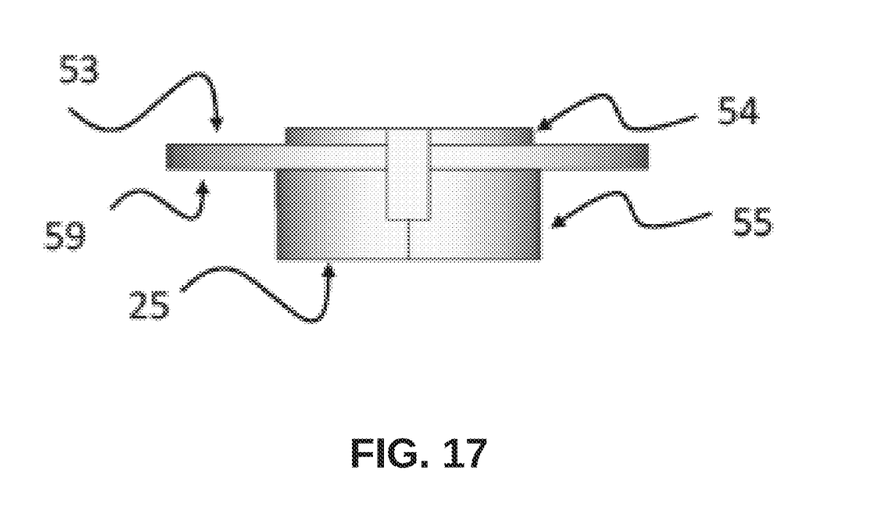
FIG. 17 is a side view of the bottom enclosure taken along line 4-4 of FIG. 10.
Figure 18:
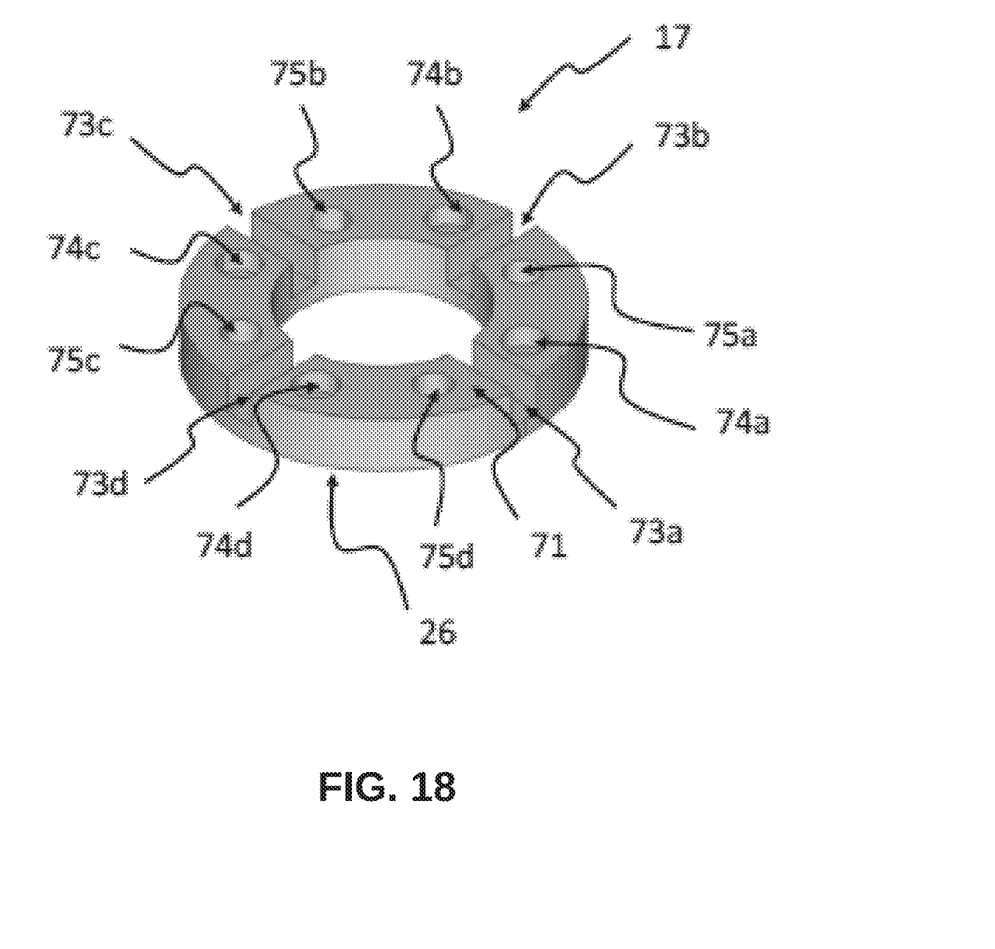
FIG. 18 is an isometric view of the mounting ring for the embodiment shown in FIGS. 1-5.

Now referring to FIG. 18, the detail view of the mounting ring 17 used in the embodiment shown in FIGS. 1-5 is illustrated. The mounting ring provides the mechanical base for the mounting of the transducer. The bottom surface 26 of the mounting ring is needed to be welded to the work structure. The mounting of the transducer requires threaded holes for four mounting bolts 20a-20d. The mounting provides the four precision threaded holes 75a-75d on the top surface 71 of the mounting ring when precision machining on work structure is not possible. The top surface 71 also has four blind clearance holes 74a-74d for the head of four bolts 27a-27d. The four clearance slots 73a-73d are used to provide clearance to the rod 15 and tube 16 for rf connections to the backing 10. The four clearance slots 73a-73d allow the easy mounting of the transducer with rf connection extruding in either of four directions.

The invention provides an improved transducer for transmitting and sonic energy for use in high temperature, high pressure and in radiation environment. The superior benefits of the transducer herein described are central loading to provide uniform contact pressure between work structure and the piezoelectric element. Furthermore, the material choice and maintaining the contact pressure are necessary for quality operation at all temperatures. Apart from high temperature performance, the choice of material and design also ensure the long term operation in radiation environment.

While the invention has been described with a certain degree of particularity, it is manifest that many changes may be made in detail of construction and the arrangement of components without departing from the spirit and scope of this disclosure. The present embodiment is to be considered as an exemplification of the invention, and is not intended to limit the invention to the specific embodiments herein illustrated by the figures or description above.

What is claimed is:

1. An ultrasonic transducer comprising:
   a backing comprising a piezoelectric element mounted on a front face of the backing, wherein the backing enables operation in high temperature and radiation applications;
   a first enclosure comprising a threaded through hole; and
   a second enclosure comprising an opening, wherein the first and second enclosure encapsulates the backing,
   wherein the first enclosure and the second enclosure are joined together using a mechanical fastener,
   wherein the first enclosure is configured to receive a set screw through the threaded through hole, and wherein the set screw upon being received is configured to make contact with a ceramic ball, and wherein tightening of the set screw over the ceramic ball pushes the piezoelectric element out of the opening in the second enclosure to make a contact with a work structure.

2. The ultrasonic transducer of claim 1 further comprising:
   a ceramic washer;
   the ceramic ball; and
   a set of ceramic rods, wherein each of the ceramic washer, the ceramic ball, and the set of ceramic rods electrically isolate the backing from the first enclosure and the second enclosure, wherein the first enclosure and the second enclosure enclose the ceramic washer, the ceramic ball, and the set of ceramic rods.

3. The ultrasonic transducer of claim 1 further comprising:
   a threaded rod; and
   an internally threaded tube receiving the threaded rod, wherein the threaded rod and the internally threaded tube establish an electrical connection to the backing, and wherein the threaded rod and the internally threaded tube are electrically isolated from the first enclosure and the second enclosure.

4. The ultrasonic transducer of claim 3, wherein the first enclosure and the second enclosure encloses the internally threaded tube receiving the threaded rod, and wherein the first enclosure and the second enclosure further enclose a carbon steel spring washer.

5. The ultrasonic transducer of claim 4, wherein the carbon steel spring washer retracts the backing inside the first enclosure and the second enclosure to prevent damages to the piezoelectric element, when at least one criterion is met.

6. The ultrasonic transducer of claim 5, wherein the at least one criterion comprises:
the ultrasonic transducer not being mounted on the work structure.

7. The ultrasonic transducer of claim 1, wherein the piezoelectric element comprises at least one of LiNbCF, quartz, Aluminum Nitride, or ZNO.

8. The ultrasonic transducer of claim 7, wherein a surface of the piezoelectric element that can contact the work structure is coated with a film comprising one of chromium or gold, wherein the film acts as a high temperature mechanical couplant for efficient transfer of sonic energy from the piezoelectric element to a work structure.

9. The ultrasonic transducer of claim 1, wherein upon establishing an electrical contact, the set screw is used to apply force on the piezoelectric element.

10. The ultrasonic transducer of claim 1, wherein the first enclosure further comprising a clearance for the backing and the ceramic ball to retract inside the first enclosure.

11. The ultrasonic transducer of claim 1, wherein the second enclosure further comprising a clearance to house the ceramic washer, the carbon steel spring washer, the backing, and the ceramic ball.

* * * * *

UNITED STATES PATENT AND TRADEMARK OFFICE
CERTIFICATE OF CORRECTION

Page 1 of 1

PATENT NO. : 11,620,973 B2
APPLICATION NO. : 16/528581
DATED : April 4, 2023
INVENTOR(S) : Dan Xiang and Uday Singh It is certified that error appears in the above-identified patent and that said Letters Patent is hereby corrected as shown below:

In the Specification

Column 1, Line 10 insert:
--This Invention was made with U.S. Government support under Contract No. DDOE, # DE-SC0013745 awarded by the Department of Energy. The Government has certain rights in this invention.--

Signed and Sealed this
Twenty-second Day of October, 2024

Katherine Kelly Vidal
*Director of the United States Patent and Trademark Office*